United States Patent [19]

Brynjegard

[11] 3,751,830

[45] Aug. 14, 1973

[54] ASTROLOGICAL TIME CORRECTOR

[76] Inventor: Olaf G. Brynjegard, 7433 Irondale Ave., Canoga Park, Calif. 91306

[22] Filed: Dec. 4, 1972

[21] Appl. No.: 311,918

[52] U.S. Cl. ................................................. 35/44
[51] Int. Cl. .......................................... G09b 29/00
[58] Field of Search .................................. 35/44, 43

[56] References Cited
UNITED STATES PATENTS

| | | | |
|---|---|---|---|
| 482,278 | 9/1892 | Slater | 35/43 |
| 2,315,316 | 3/1943 | Cissna | 35/44 |
| 2,518,664 | 8/1950 | Chern | 35/44 |
| 3,355,822 | 12/1967 | Losey | 35/44 |

*Primary Examiner*—Wm. H. Grieb
*Attorney*—Wm. Jacquet Gribble

[57] ABSTRACT

A base sheet is divided into calendar year date segments in accordance with the astrological "houses" in the plane of the ecliptic. The base sheet data is a projection at a 23°28' tilt with respect to the earth's polar axis.

A circular time chart divided at its periphery into 24 hours of the day overlies a transparent sheet divided by parallel lines extending from a line passing through the common center of both time chart and transparent sheet. Both are movable along an axis of the base sheet marked in degrees of latitude north and south of the equator. A common pivot enables the transparent sheet and the time chart to rotate with respect to the base sheet to accommodate settings for any birthdate and birth time at any birthplace latitude, and to read on the base sheet the ascendant (or rising) sign at the instant of birth.

7 Claims, 6 Drawing Figures

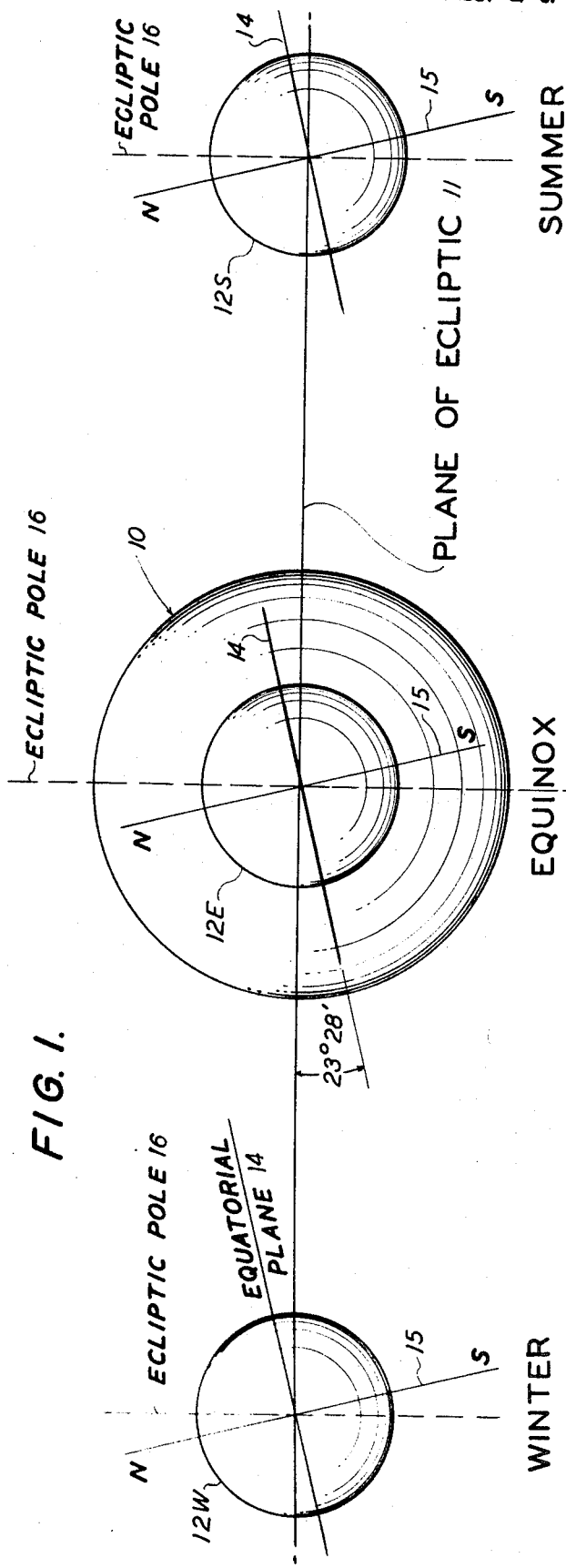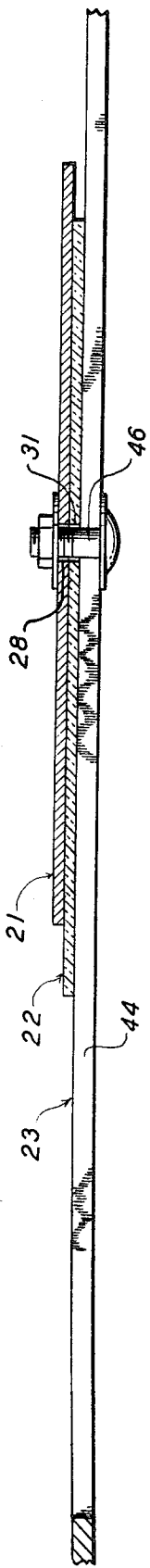

ASTROLOGICAL TIME CORRECTOR

BACKGROUND OF THE INVENTION

The invention relates to devices for changing Greenwich-based time to star time or siderial time, and more particularly for such devices relating such correction to the astrological houses. As is well known, the signs of the zodiac are 12 in number representing arcuate zones around the sun in the plane of orbit of the earth. The plane of orbit is known as the "plane of the ecliptic" since the orbits of all of the planets are substantially within a common plane passing through the sun. Thus the earth passes through each of the 12 zodiac zones or houses in one year, dwelling about 30 days in each house. The house is divided into 30° and each day the earth is resident in a progressively advancing degree segment of the "house."

Conventional astrology is based upon the influence various planets or other siderial bodies are thought to exert upon a person's life. The birth day gives the zodiac sign or "house" of the person. The ascendant sign at the time of birth is the degree of a house or segment of the zodiac sign that is just ascending over the horizon at the location of birth at the time of birth. Determination of the exact time of birth in relationship to siderial time, as determined in the plane of the ecliptic, is essential to accurate astrological forecast, since the degree of ascendancy of the sign is the starting point of any individual astrological chart.

The problem of translating nominal time zones based on Greenwich time to siderial time has been recognized and various tables have been composed for such correction. However, such tables, while effecting some adjustment for the difference between nominal time and siderial time due to birthplace displacement from Greenwich have largely ignored the problems of seasonal angular distortion due to the earth's orbit and are truly accurate only for those persons born adjacent Greenwich on either the autumnal or vernal equinox. The previous corrections were also unable to correct for space displacement of those few people born beyond the Arctic and Anarctic Circles, those circles defined by or generated by the ecliptic pole intersecting the earth surface as the earth undulates about the ecliptic pole.

The instant invention provides means for making the time corrections necessary to determine precisely the ascendant sign at the time of birth and reads out the ascendant sign directly with respect to its degree of ascendancy, that is, the number of degrees of the 30° of a house through which the earth has traversed, providing astrological data for charting of the highest degree of accuracy.

SUMMARY OF THE INVENTION

The invention contemplates apparatus comprising a base sheet with indicia indicating a calendar year divided and subdivided in accordance with the astrological houses, indicia on the base sheet along one axis spaced from an equatorial center toward each pole and indicating latitude from the equator, and a time chart and a transparent correlating sheet. The time chart and correlating sheet are movable along the polar axis of the base sheet and each is independently rotatable in the plane of the base sheet about a common axis. Preferably the base sheet is slotted along the polar axis and pivot means secure the chart and correlating sheet slidably to the base sheet.

The apparatus of the invention affords means for accurately adjusting nominal time based on Greenwich to astrological time as measured on the plane of the ecliptic for any point on earth and for any time of the year. The apparatus is simple to use, economical to fabricate and unique in accuracy.

BRIEF DESCRIPTION OF THE DRAWING

FIG. 1 is a schematic representation of the progression of the earth about the sun showing the relationship of the earth's equatorial plane to the plane of the ecliptic of the planets;

FIG. 6 is a fragmentary sectional elevation taken along line 6—6 of FIG. 2.

ASTROLOGICAL BACKGROUND

In FIG. 1 the sun is represented by the circle 10 and the planetary plane of the ecliptic is indicated by the line 11 passing through the center of the sun. The earth is shown in three positions indicated by the circles 12W, 12E and 12S. In each instance the earth's rotational pole is indicated by the line 15. The ecliptic pole is represented by the broken line 16. As is graphically evident from FIG. 1, the earth's equatorial plane and rotational pole deviate from the plane of the ecliptic and the ecliptical pole of the earth by some 23°. It is thus evident that the houses of the zodiac, which are theoretically laid out in the plane of the ecliptic will differingly divide a circle laid in the equatorial plane of the earth. It is also evident that true zenith or noontime will vary through the seasons depending on the latitude of the point of observation. Since the earth "resides" for 30 days in each of the zodiac houses or zones and during that 30 days the attitude of the equatorial plane with respect to the center of the sun varies, it is necessary to separately ascertain the ascendancy within the zone of the zodiac sign for each day and hour of residence within the sign zone.

The base sheet of the time corrector of the invention is therefore divided in zodiac zones in accordance with an angular projection of the divided zodiac zones from the plane of the ecliptic to the equatorial plane of the earth such that the date indicia on the sheet are correctly related to the 360° sweep of the zodiac. Because of the pattern of undulating or sinusoidal movement of a particular location on the earth's surface with respect to the plane of the ecliptic during the revolution of the earth about the sun, it is necessary to adjust the circular time chart with respect to the equinoctial axis of the zodiac in order to properly adjust for time differentials. Correction for these factors are provided for as shown in the following described apparatus of the invention.

DESCRIPTION OF THE PREFERRED EMBODIMENT

Figure 3:
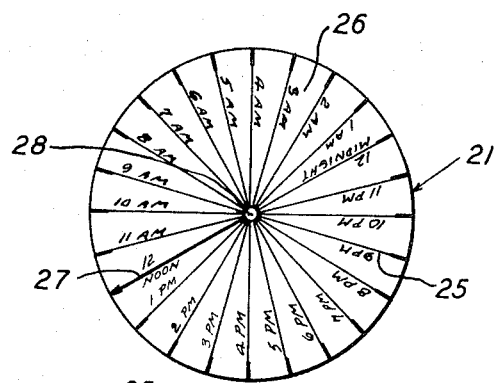
FIG. 3 is a plan view of the time chart of the invention.
Figure 4:
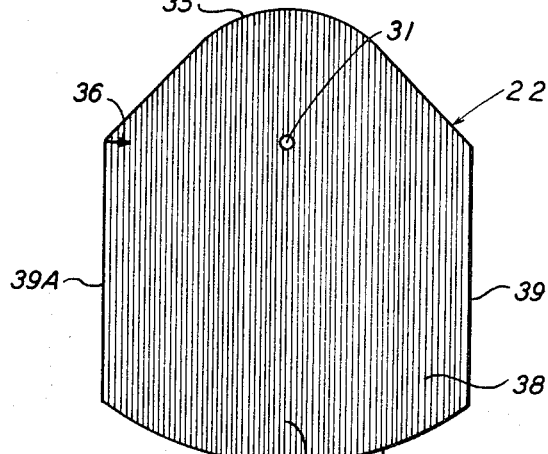
FIG. 4 is a plan view of the transparent sheet divided by parallel lines.
Figure 5:
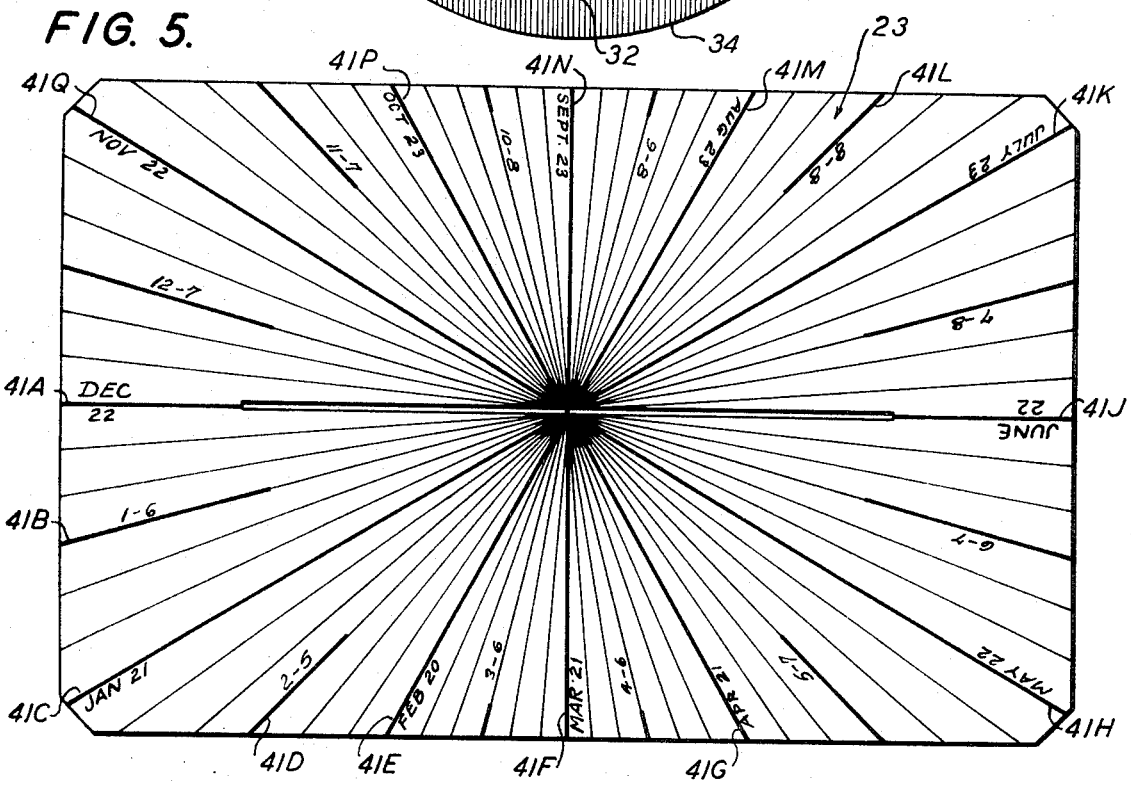
FIG. 5 is a plan view of the base sheet of the invention without indicia.

The time corrector apparatus of the invention comprises a circular time chart 21, a gridded transparent sheet 22 and a base sheet 23, which are shown in FIGS. 3, 4 and 5, respectively.

The circular time chart has a plurality of radial lines 25 dividing the chart into hourly time segments such as the segment 26. A noon arrow 27 extends to the periphery of the chart. The chart has a central aperture 28. As can be seen from FIG. 2, drawn to a larger scale, the chart may be further subdivided to simplify exact adjustment with respect to quarter hours. Other further subdivisions may be made if desired.

Figure 2:
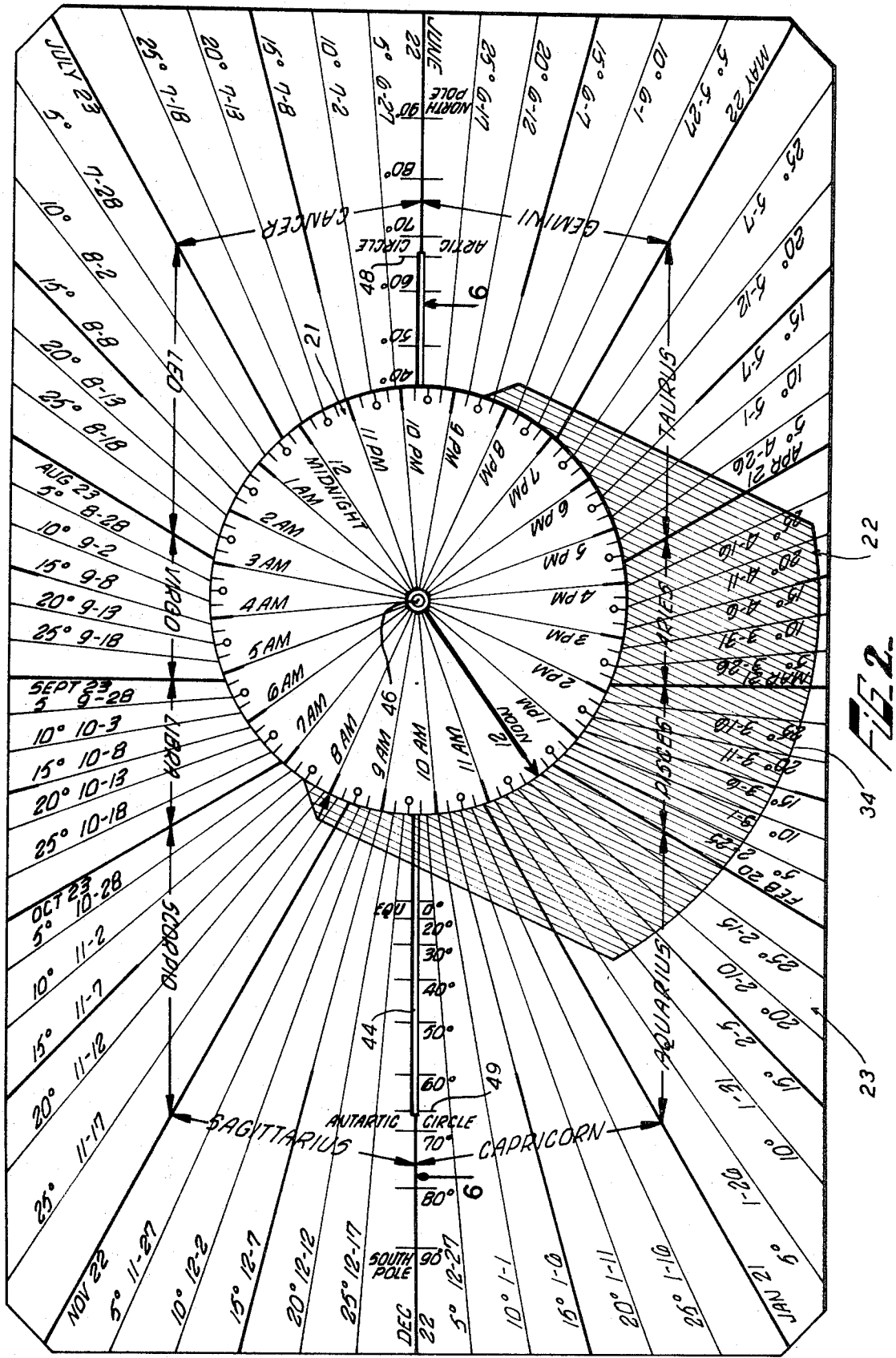
FIG. 2 is a plan view of the time corrector of the invention in use.

Time chart 21 overlies gridded transparent sheet 22 in the assembly of FIG. 2. As can be seen from FIG. 4, the gridded transparent sheet 22 has an aperture 31 through which a central grid line 32 extends. Gridded sheet 22 has peripheral arcs 34, 35 defining opposite sides of aperture 31, arc 34 being larger than arc 35. At a peripheral point, spaced perpendicularly from central grid line 32, is an indicator arrow 36. The point of the arrow is spaced a distance from the aperture 31 slightly greater than the radius of the time chart such that it is visible when overlain by the time chart (see FIG. 2). A plurality of grid lines 38 parallel to central grid line 32 are lined on the transparent sheet between parallel straight borders 39 and 39A.

FIG. 5 shows base sheet 23 which, as previously described, is divided by radial lines 41A through 41Q which define the zodiac zones. The base sheet may be annotated with the dates of the earth calendar on which the earth makes a transition from one zodiac zone to another. For instance, radial line 41A represents the winter solstice and line 41J represents the summer solstice. The vernal and autumnal equinoxes are represented or defined by lines 41F and 41N.

Further radial lines between the 41 series radial lines subdivide each of the zodiac zones into subzones that in each instance are six in number. Because of the base sheet being laid out such that the radial lines are a projection to the tilted plane of the earth, from the evenly divided plan of the ecliptic the radial lines tend to be more closely spaced near the vernal and autumnal equinoxes than they are near the winter and summer solstices.

Along the solstice axis of the base sheet is a slot 44. Through this slot a pivot member, such as the screw 46 of FIG. 6, extends to pivotally secure the time chart and the gridded sheet to not only pivot with respect to the base sheet but slide with respect to the solstice axis. The slot extends equal distances from the vernal equinox axis and terminates at each end near an index line 48, 49. The index line 48 indicates the Arctic Circle and the index line 49 indicates the Antarctic Circle. Degrees of latitude are indicated along the slot from an equatorial 0 on either side of the equinox axis to the North or South Pole, depending on which side of the axis the indices run. The equatorial 0 marks are spaced along the slot a distance equal to the diameter of the time chart. This is because the time chart performs the dual function of indicating the hour of birth and position of the place of birth with respect to the equator. Its diameter is ½ span from line 48 to 49.

With the time chart and the gridded sheet pivotally secured by screw 46 with respect to the base sheet, the elements of the astrological time corrector are ready for use. In operation the adjustments of the various corrector elements are simple. Step One is to slide the time chart such that its periphery is tangent to the degree of latitude either north or south approximating the latitude of the birthplace of the subject whose astrological forecast is to be determined. The subject whose birth data are represented by the positions of the astrological time corrector in FIG. 2 was born in the Northern Hemisphere at about latitude 39, as at Kansas City. When the proper latitude positioning has been made, the time chart is then rotated until the noon hour line or arrow coincides with or is spaced between the radial date lines indicating the day of birth. The time chart in FIG. 2 is positioned such that the noon hour lies almost midway between the 20° and 25° radial lines subdividing the zone of Aquarius, indicating a birthdate of February 13th.

Keeping in mind that the utility of the astrological time corrector is to determine the ascendant sign of the subject at the time of birth and the degree of ascendancy in the particular zodiac sign zone, it can be understood that the next adjustment is to move the transparent gridded sheet such that the arrow 36 thereof coincides with the time of birth at the location of birth. Thus, the gridded sheet 22 is moved so that its arrow 36 coincides with the radial line marked 8:00 A.M. on the time chart. Thus, the chart indicates that the subject was born at about 39° North latitude on the 13th of February at 8:00 A.M. The grid lines 38 are thus positioned perpendicular to the time line radius running through 8:00 A.M. in a position to indicate which sign was on the horizon at the moment of birth. Because the gridded sheet 22 is transparent the radial lines subdividing the base sheet are visible. This is convenient since it is necessary to achieve coincidence between the grid lines of the gridded sheet and the radial subdividing lines of each of the signs. Close inspection will show that coincidence is achieved in the zone of Pisces and that such coincidence indicates that the sign was ascendant about one-sixth of the way (5°) at the hour of birth. The subject's ascendant sign is therefore 5° Pisces and the astrological forecast is projected from the degree of ascendancy as the starting point.

It can be appreciated that for each individual whose horoscope is to be forecast the time corrector can be adjusted both for the latitude of the place of birth, the date or birth and the hour of birth with respect to the position of the earth and tilt of the earth in relation to the ecliptic plane.

While one embodiment of the invention has been shown and described to illustrate the invention, it is to be understood that the components thereof may take varying physical characteristics and shapes. Variations will occur to those skilled in this particular art. It is therefore desired that the scope of the invention be measured by the appended claims rather than by the illustrative embodiments herein disclosed.

I claim:

1. Apparatus for converting terrestrial nominal time and position to siderial time and position with respect to the plane of the ecliptic and comprising a base sheet, indicia dividing the base sheet along radial lines, including a solstice line, said radial lines being a projection to the base sheet of a like radially divided circle tilted at an angle to the base sheet equal to the tilt of the equatorial plane of the earth to the ecliptic plane of the planets; a light transmitting second sheet pivotally and slidably secured to the base sheet to move thereupon parallel to the solstice line, indicia on the second sheet including lines parallel to a central axis of the second sheet passing through the pivot point of the second sheet with respect to the base sheet; and a time chart secured to move with the second sheet and adapted to pivot with respect to the base sheet and the second sheet, and indicia on the time chart dividing said chart in accordance with the hours of a terrestrial day; and base sheet indicia indicating the displacement along the solstice line in accordance with latitude from the terrestrial equator.

2. Apparatus in accordance with claim 1 further comprising parallel base sheet walls defining a slot passing through the center of the base sheet at the focus of the radial lines and extending along the solstice line of the base sheet, a slider adapted to move in the slot defined by the walls, and means securing the second sheet and the time chart to the slider.

3. Apparatus in accordance with claim 1 wherein the base sheet indicia are discernable through the second sheet such that coincidence or noncoincidence of second sheet parallel lines with underlying base sheet radial lines is observable.

4. Apparatus in accordance with claim 1 wherein the indicia dividing the base sheet with radial lines describe zodiac zones further subdivided into equal segments.

5. Apparatus for converting terrestrial nominal time and position to siderial time and position with respect to the planetary plane of the ecliptic and comprising a base sheet, indicia dividing the base sheet with radial lines including a diametric solstice line, said radial lines being a projection to the base sheet of a like radially divided circle tilted at an angle to the base sheet equal to the tilt of the equatorial plane of the earth to the ecliptic plane of the planets; parallel base sheet walls defining a slot passing through the center of the base sheet at the focus of the radial lines and along the solstice line parallel to the plane of the dihedral angle of tilt, a slider adapted to move in the slot; a light transmitting second sheet pivotally secured to the slider to move therewith, indicia on the second sheet including lines parallel to a central axis of the second sheet passing through the pivot point of the second sheet with respect to the base sheet; a time chart secured to the slider to move therewith and adapted to pivot with respect to the base sheet and the second sheet, and indicia dividing the time chart peripherally in accordance with the hours of a terrestrial day, said base sheet indicia being visible through the second sheet such that coincidence or noncoincidence of second sheet lines with base sheet radial lines is observable; and base sheet indicia indicating the displacement along the slot in accordance with latitude from the terrestrial equator.

6. Apparatus in accordance with claim 5 wherein the indicia dividing the base sheet with radial lines describe zodiac zones further subdivided into equal segments.

7. Apparatus in accordance with claim 5 further comprising indicia along the base sheet indicating North and South poles oppositely located along the solstice axis and slot, and indicia on the base sheet intermediate the poles indicating Artic Circle and Antartic Circle positions, said time chart having a diameter equal to one-half the span between the Artic and Antartic Circle positions.

* * * * *